United States Patent
Chaudhari et al.

(10) Patent No.: US 7,031,923 B1
(45) Date of Patent: Apr. 18, 2006

(54) VERBAL UTTERANCE REJECTION USING A LABELLER WITH GRAMMATICAL CONSTRAINTS

(75) Inventors: Upendra V. Chaudhari, Elmsford, NY (US); Stephane H. Maes, Danbury, CT (US); Jiri Navratil, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/519,327

(22) Filed: Mar. 6, 2000

(51) Int. Cl.
*G10L 21/00* (2006.01)

(52) U.S. Cl. ...................... 704/273; 704/235

(58) Field of Classification Search ................ 704/273, 704/270, 275, 272, 235, 256, 251, 255
See application file for complete search history.

(56) References Cited

U.S. PATENT DOCUMENTS

| | | | | |
|---|---|---|---|---|
| 4,882,757 A | * | 11/1989 | Fisher et al. ............. | 704/253 |
| 5,293,452 A | * | 3/1994 | Picone et al. ............ | 704/250 |
| 5,465,317 A | | 11/1995 | Epstein | |
| 5,613,037 A | | 3/1997 | Sukkar | |
| 5,717,826 A | * | 2/1998 | Setlur et al. ............. | 704/240 |
| 5,897,616 A | | 4/1999 | Kanevsky et al. | |
| 6,119,084 A | * | 9/2000 | Roberts et al. .......... | 704/243 |

FOREIGN PATENT DOCUMENTS

| | | |
|---|---|---|
| JP | 62-217297 | 9/1987 |
| JP | 08-221091 | 8/1996 |
| JP | 08-278794 | 10/1996 |
| JP | 09-114484 | 5/1997 |
| JP | 09-127972 | 5/1997 |
| JP | 19-245125 | 9/1997 |
| JP | 10-097535 | 4/1998 |
| JP | 10-232693 | 9/1998 |
| JP | 10-274996 | 10/1998 |
| JP | 2002-510075 | 4/2002 |
| WO | 99/50829 | 10/1999 |

OTHER PUBLICATIONS

O'Shaughnessy, D., Speech Communication: Human and Machine, 1987, pp. 468-4703.*
D.A. James et al., "A Fast Lattice-Based Approach to Vocabulary Independent Wordspotting", Proc. of the Int'l Conf. on Acoustics, Speech, and Signal Processing, Adelaide, Australia, 1994.
L.R. Rabiner et al., "Considerations in Dynamic Time Warping Algorithms for Discrete Word Recognition" IEEE Trans. on Acoustics, Speech, and Signal Processing, vol. ASSP-26, No. 6, Dec. 1978.
Ramabhadran et al., "Acoustics Only Based Automatic Phonetic Baseform Generation", ICASSP'98, Seattle, 1998.

(Continued)

*Primary Examiner*—Angela Armstrong
(74) *Attorney, Agent, or Firm*—Ference & Associates

(57) ABSTRACT

Methods and apparatus for verifying spoken passwords and sentences with small decoder complexity requirements. A proposed method permits the verbal verification of a spoken password sentence without computationally extensive large-vocabulary decoding. A decoder preferably uses target baseforms (representing the original content to be verified) together with a special set of competing simplified baseforms that may be easily constructed using finite-state grammars (FSG).

19 Claims, 2 Drawing Sheets

OTHER PUBLICATIONS

Mori et al., "A Structural Stochastic Language Model", Research Report, vol. 2000, No. 64, p. 13-18.

Mori et al., "A Stochastic Parser Based on a Structural Word Dependency Model", IPSJ Research Report, vol. 2000, No. 107, p. 143-150.

"A Stochastic Parser Based on a Structural Word Unit Dependency", NLP, vol. 6, p. 479-482.

"Statistical Spoken Language Processing", Journal of IEICE, vol. 82, No. 8, p. 828-831.

* cited by examiner

VERBAL UTTERANCE REJECTION USING A LABELLER WITH GRAMMATICAL CONSTRAINTS

FIELD OF THE INVENTION

The present invention generally relates to methods and apparatus for verifying spoken passwords and sentences.

BACKGROUND OF THE INVENTION

The concept of verbal utterance acceptance and rejection is increasingly prevalent in a wide variety of technologies and products that have been emerging in recent years. For instance, one technology gaining significantly in popular acceptance and use is automatic telephone dialing whereby, upon uttering a keyword or keyphrase such as "Mom", "Office", "Dr. Smith", etc., an appropriate telephone number corresponding to the keyword/keyphrase will automatically be dialed, thus obviating the need for the user to have committed the number to memory or to have looked it up. A distinct advantage in comparison with keypad-type memory-based dialing systems, in which a commonly used number can be automatically dialed by pushing one or a few buttons on a telephone, is that such shortcuts do not have to be consciously looked up or committed to memory, either. Other applications of verbally prompted commands are of course prevalent and contemplated, and their use is bound to increase with the development of additional technologies and products that are well-suited for such commands.

Conventional methods and apparatus for verifying spoken passwords and sentences employ "acoustic likelihoods" resulting from a decoding process. An acoustic likelihood is the probability that a spoken password or sentence actually matches a given target password or sentence.

Conventionally, acoustic likelihoods are typically normalized on an utterance basis, while predetermined thresholds are applied for purposes of verification (i.e., should a verbal utterance meet a certain threshold in terms of the degree to which it matches a target word or phrase, based on given factors, it is construed as sufficiently matching the target word or phrase).

A verbal approach in the vein of the above is in U.S. Pat. No. 5,717,826 (Lucent Technologies, Inc.). In this case, however, a full decoder is used to obtain the transcription of the keywords. The password modeling is done outside of the decoder in a second stage.

Similar arrangements are disclosed elsewhere which, in turn, tend not to solve problems and address issues in a manner that may be presently desired. U.S. Pat. No. 5,465,317, entitled "Speech recognition system with improved rejection . . . ", discloses a threshold-based technique based on acoustic likelihoods, as does U.S. Pat. No. 5,613,037, entitled "Rejection of non-digit strings for connected digit speech recognition".

In view of the foregoing, a need has been recognized in conjunction with improving upon previous efforts in the field and surmounting their shortcomings discussed heretofore.

SUMMARY OF THE INVENTION

In accordance with at least one presently preferred embodiment of the present invention, a proposed method permits the verbal verification of a spoken password sentence (as opposed to the use of acoustic thresholds) to verify a spoken password sentence without computationally extensive large-vocabulary decoding. A decoder preferably uses target baseforms (representing the original content to be verified) together with a special set of competing simplified baseforms that may be easily constructed using finite-state grammars (FSG). Thus, in accordance with at least one embodiment of the present invention, a significant difference with respect to previous efforts is that the implicit password search within the decoder allows for a very low decoding complexity.

In a simple configuration, the decoder may be carrying out a forced alignment on the password baseform with optional skip transitions added to the FSG graph (i.e. the competing baseforms are derived from the target baseform by replacing certain parts of it with null-arcs). If the spoken utterance, e.g. a digit string, does not correspond to the target baseform, the probability is high for the resulting hypothesis not to match the full baseform due to some of the skip transitions that were used by the decoder. The same is applicable for passwords enrolled as acoustic addwords as described in further detail herebelow.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

Figure 1:
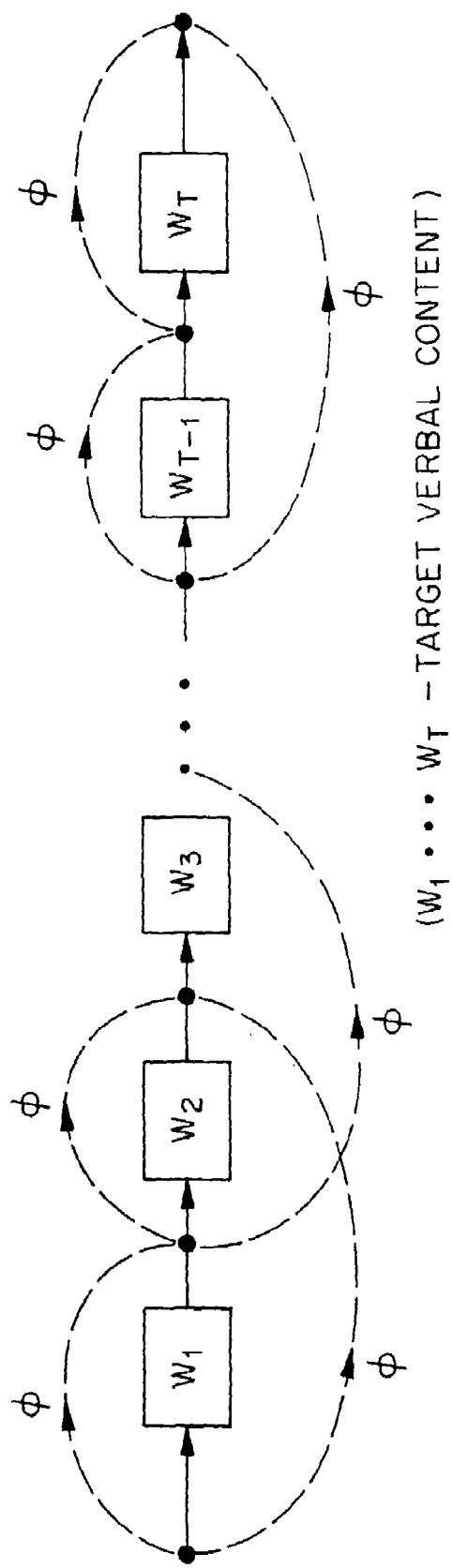
FIG. 1 shows a decoding graph with modified transition structure.
Figure 2:
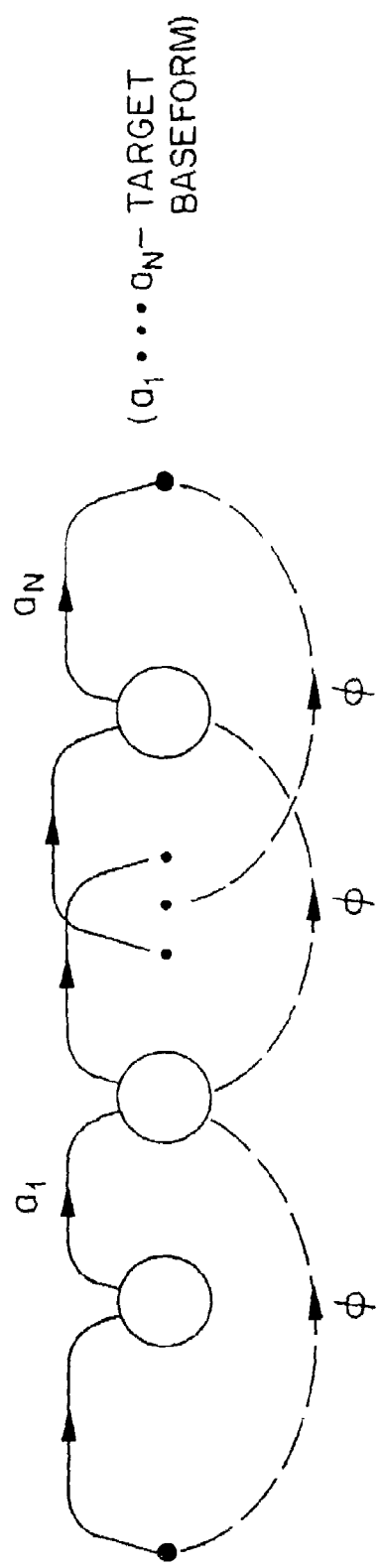
FIG. 2 shows a decoding graph for an addword-baseform with modified transition structure.

In accordance with at least one preferred embodiment of the present invention, it is conceivable to employ an utterance verification system in at least two functional configurations of user enrollment, both of which are described herebelow and are illustrated schematically in FIGS. 1 and 2, respectively.

In the first configuration, relating to FIG. 1, a password is selected by the user and the textual form of the password is communicated to the system, e.g. by choosing or specifying a digit string. Thus, the lexical transcription of the password is initially known. In this connection, FIG. 1 shows a decoding graph with a modified transition structure, using null-arcs for exemplary purposes.

The decoder preferably implements a Viterbi search with a word finite-state grammar (FSG), putting constraints on the search space within the trellis. (A Viterbi search is a search for an optimal path out of many through a trellis structure, given some well-defined likelihood measure. A description of a Viterbi search can be found in the context of a balistic decoder as described in copending and commonly assigned U.S. patent application Ser. No. 09/015,150 as well as an article corresponding thereto, namely, "Acoustics Only Based Automatic Phonetic Baseform Generation", Ramabhadran et al., ICASSP'98, Seattle, 1998.) A password is preferably selected by a user during an enrollment stage, and the password forms the first part of the FSG.

The example of a four-digit password is shown in FIG. 1. Further, this part of the FSG will preferably only allow for transitions between the respective digits $w_1 \ldots w_T$ in the initially determined order ("forced alignment"). Optionally, the first part of the FSG may allow for silences and certain non-speech events (such as pauses, hesitations etc.) between the individual words.

The second part of the FSG accounts for competing decoding paths if an actual utterance does not comply with the correct password-utterance form. These units may be individual competitor words (e.g., "pat" instead of "bat"), wordclasses, garbage models, or non-emitting ("null") arcs (O) achieving skips to the next or any following unit specified in the first FSG-part. The null arcs (O), in particular, are shown in FIG. 1.

With regard to competitor words, it should be noted that their choice depends upon the application in which the utterance rejection is being implemented and the setup at hand. For example, if there are two passwords for two users whose parts sound very similar, such as "pat" for a first user and "bat" for a second user, then "pat" could be a competitor word for verifying the second user while "bat" could be a competitor word for verifying the first user. However, competitor words could even be very dissimilar words, with their choice depending upon the application at hand.

A "wordclass" may be considered as a group that covers both grammatical forms (e.g., "plate" vs. "plated") as well as lexical groups. A digit wordclass, for instance, could include the digits "zero" through "nine", but excluding the respective target digit of the target utterance.

"Garbage", in the context expressed above, may be considered to be units that capture many different sounds whose origin may or may not be linguistically meaningful, such as mumble sounds, various background sounds, etc.

FIG. 2 shows a decoding graph for an addword-baseform with a modified transition structure. The decoder configuration involved is one in which the lexical structure of acoustic password is unknown. Accordingly, in the embodiment illustrated in FIG. 2, a password is selected by the user, but this time the user enrolls the password merely as an acoustic utterance, i.e. without specifying the corresponding text transcription to the system.

In contrast to the embodiment illustrated in FIG. 1, an enrollment stage will involve presenting the user password (and possible repetitions thereof) to the system in acoustic form. The system uses a decoder (preferably a balistic decoder such as that described in U.S. patent application Ser. No. 09/015,150 and Ramabhadran et al., supra) to obtain the transcription in terms of the decoder units, typically phones or phone classes. The transcription is then is stored.

Subsequently, utterance verification may proceed by constraining the decoder graph (i.e., the trellis space) to allow for the transitions according to the correct-password transcription(s) as seen in the enrollment stage. However, the constraints are preferably "loosened" by OR-adding competing units, unit-classes or skips to the forced-alignment-part of the grammar, so as to allow for decoding alternatives when the actual utterance differs from the correct password.

In brief recapitulation of the embodiments described and illustrated with respect to FIGS. 1 and 2, it will be appreciated that the present invention, in accordance with at least one presently preferred embodiment, broadly embraces at least two different operating environments related to the manner in which passwords are enrolled in the decoding system.

In a first environment, as described and illustrated with respect to FIG. 1, enrollment takes place essentially by textual communication such as, for example, typing in a word. A FSG is then generated. The FSG is preferably comprised of two parts. The first part preferably comprises the password selected by the user during enrollment in addition to minor variations on the password. Thus, this first part of the FSG may preferably be expanded beyond the "purely" enrolled password itself to variations of the password that have silences and non-speech events such as pauses and hesitations incorporated between individual words.

A second part of the FSG, on the other hand, will preferably account for competing decoding paths if a future utterance (that is to be compared to the enrolled password) does not comply with the enrolled password form. Thus, the second part of the FSG may preferably be comprised of known competitor words, wordclasses, garbage models or non-emitting (O) arcs that embody skips to the next or a following unit specified in the first part of the FSG. In this connection, FIG. 1 is instructive in illustrating possible null-arc (O) paths. As a non-restrictive example of a simple algorithm that may be used for generating the second part of an FSG, for instance, one could add a skip transition for every single word, then add a skip transition over every two adjacent words. This principle may be continued for three and more adjacent words until the last skip transition added is one that "bridges" the complete word sequence as one large skip transition.

The embodiment of FIG. 2, however, relates to password enrollment that takes place acoustically, rather than textually. U.S. patent application Ser. No. 09/015,150 describes, in detail, a method and arrangement for deriving a phonetically transcribed baseform on the basis of an acoustic enrollment. Thus, it is contemplated herein that the embodiment described and illustrated with respect to FIG. 2 will preferably employ a transcription arrangement such as that described in U.S. Ser. No. 09/015,150 and Ramabhadran et al., supra, or a suitable substitute, for the purpose of deriving a phonetic transcription of an acoustic password enrollment, which is preferably stored for future use in being compared with future user utterances. Possible substitutes for the transcription arrangement described in U.S. Ser. No. 09/015,150 and Ramabhadran et al., supra, are other common methods for phoneme recognition, such as vector quantising techniques or artificial neural networks.

Similarly to the embodiment described and illustrated with respect to FIG. 1, a FSG is preferably constrained to allow for transitions according to the "correct" password transcription as seen in the enrollment stage and as defined by a forced-alignment graph. The graph is preferably defined by a trellis space (see U.S. Ser. No. 09/015,150). However, the constraints are preferably expanded or "loosened" by adding competing units, unit classes or skips (ø), via OR—logic, to the forced-alignment portion of the FSG, so as to allow for decoding alternatives when an actual utterance differs from the correct password. FIG. 2 is particularly instructive in illustrating a decoding graph with a modified transition structure, in this case embodied by null-arcs (ø), where $a_1 \ldots a_N$ represent the target baseform and each individual element $a_1$, $a_2$, etc., represents an arc between "nodes" (represented by circles). If the transcription arrangement of U.S. Ser. No. 09/015,150, or functional equivalent, is used, it will be appreciated that the aforementioned arcs could be subcomponents of single phone, wherein three such subcomponents may combine to constitute the phone. The "nodes" may essentially constitute "passages" of a password, or may simply be thought of as discrete time steps, in between which the aforementioned "arcs" extend. The solid circles, which each preferably initiate and terminate the arc sequence, respectively, in the graph illustrated in FIG. 2, may be construed, respectively, as representing a state of silence prior to and subsequent to the arc sequence.

Figure 3:
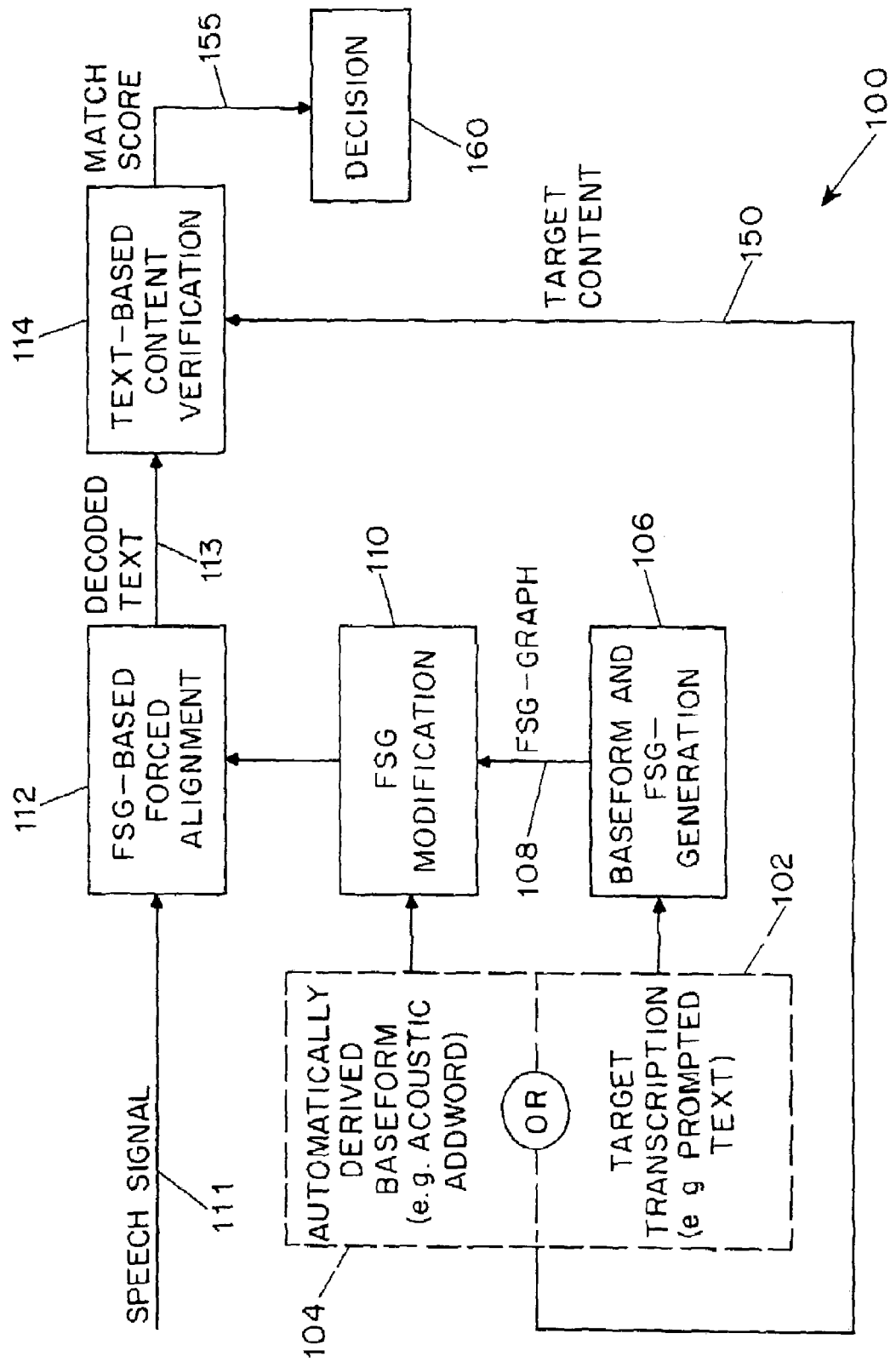
FIG. 3 illustrates, in schematic form, an overview of an utterance-verification system.

The disclosure now turns to a discussion of an overall utterance verification system 100 formed in accordance with at least one presently preferred embodiment of the present invention and as illustrated in FIG. 3. It is to be understood that the embodiment illustrated in FIG. 3 accounts for both of the enrollment sub-embodiments that were described and illustrated with respect to FIGS. 1 and 2.

Fundamentally, in connection with the utterance verification arrangement 100 shown in FIG. 3, a transcription (102, 104, respectively) that results from a decoder configuration such as either of those described and illustrated with respect to FIGS. 1 and 2, essentially undergoes a hypothesis test, and this will constitute the step of verification. Regardless of the transcription system used, the sequence in terms of the decoder's units (i.e., the words in FIG. 1 or phonemes in FIG. 2, or possibly other units if a suitable alternative technique is used for automatic baseform generation [as mentioned heretofore] that might be based on, for example, subphonetic or syllabic units) is preferably matched to the "correct" or "ideal" realization of the password in question by using a dynamic pattern matching technique that accounts for certain insertions due to minor misrecognitions, silences and non-speech events in the actual utterance.

Preferably, if prompted text 102 is used, then the corresponding baseform as well as the first part of a FSG, as described heretofore in connection with FIG. 1, will be generated at step 106. Baseform generation, in this connection, essentially involves resolving the textual input into a phonetic transcription. The resulting FSG graph 108 will then preferably be modified at step 110, for instance, by adding null arcs. This may be considered to be the step where the second part of a FSG is generated, as described heretofore in connection with FIG. 1.

If, instead of prompted text, an automatically derived baseform 104 is used, then step 106 may essentially be skipped. Thus, at step 110, there will be the modification necessary to generate a complete FSG from the baseform, as described heretofore in connection with FIG. 2.

Regardless of the alternative employed (i.e. that indicated at 102 or that indicated at 104), the result of step 110 is preferably the outputting of a complete FSG graph or trellis that will subsequently be used to resolve speech input 111 into a FSG-based forced alignment at step 112. In other words, prior to final verification (at step 114), a speech signal 111 (corresponding, e.g., to someone's attempt at issuing a password and/or a verbal prompt for telephone dialing, etc.) will be resolved into a forced-alignment graph of purely phonetic units by removing non-phonetic units (e.g., breaths, creaks, pauses, etc.) from the speech input 111, as accomplished by reconciling the raw speech input 111 with the FSG graph that has been input from step 110. Thus, for example, inasmuch as the FSG graph input from step 110 will preferably account for a variety of non-speech units (or events) interspersed among purely phonetic units, the raw speech input 111 will preferably be "stripped" of such non-speech units before being output as decoded text 113. Preferably, the FSG graph input from step 110, as discussed heretofore, may also account for competitor words, word-classes, garbage models, etc., to thus ensure forced alignment at step 112 of speech input 111 that may not even correspond precisely to the correct password.

It should be understood that, at step 112, if the speech signal 111 cannot, even in part, be accounted for by the FSG, then the decoder will preferably still undertake the act of picking one "best" path it can find given this FSG. The "best path" can be determined by essentially any suitable means, but will preferably be undertaken in such a way as to determine a path within the FSG that approximates the speech signal better than most, if not all, of the other possible paths within the FSG. Alternatively, a path may be randomly chosen by the FSG for this purpose, especially if the discrepancy between the speech signal 111 and the FSG is severe.

In either eventuality, it will be appreciated that the FSG path associated with speech signal 111 will result in a low acoustic score (if indeed acoustic scoring is used; see below) and, more importantly, the decoded unit sequence will be highly unlikely to match the target unit sequence in step 114 (see below). The latter eventuality, that is, the mismatch of units, is considered to be more reliable, either with the concomitant use of acoustic scoring or without, than pure acoustic scoring.

It is to be understood that the decoding principles described above with relation to decoding step 112 may also be applied for cases of utterances which are not expected to necessarily contain only the target sentence but also some unknown verbal content preceding and/or following the target sentence, e.g. "The password is open sesame, I think" where "open sesame" might be the expected target part. (This "relaxed" variant of utterance rejection may be particularly relevant to support applications that allow natural language input, such as in U.S. Pat. No. 5,897,616.) In this case, the decoder at 112 works as a "keyword/sentence spotter" using the FSG generated in 110 and differs from the previously described mode only in that the starting and end points of the paths of the Viterbi trellis are determined dynamically and may not necessarily be identical to the starting and end points of the speech signal 111. There are well-known methods for keyword spotting in trellis-based decoders, e.g. as described in D. A. James, S. J. Young, "A Fast Lattice-Based Approach to Vocabulary Independent Wordspotting," Proc. of the International Conference on Acoustics, Speech, and Signal Processing 1994, Adelaide, Australia.

An algorithmic example of decoding the speech signal using the FSG 110 in the keyword-spotting case might appear as follows:

1. The decoder at 112 processes the speech utterance sequentially from the beginning, frame by frame, where each frame corresponds to a short time step, typically 10–20 ms.
2. At each time frame $v_t$ the decoder creates new paths in the trellis defined by the FSG (110) that start at this frame $v_t$ and did not exist before, and, in addition, also maintains certain paths that were created (and start) at some of the previous time frames $v_1, \ldots, v_{(t-1)}$.
3. At each time frame $v_t$ the decoder also evaluates the normalized acoustic scores of the existing paths and discards those with low score values based on a pruning threshold.
4. At each time frame $v_t$ the decoder also stores and terminates partial paths which reside in the end node of the FSG 110 and which attained some local score maximum in one of the previous frames and show a consistently decreasing score trend from that frame on.
5. The decoder stops in the last time frame and selects the best partial path from the set of paths stored during step 4. This path then corresponds to the decoded text 113.

By way of brief explanation, one may assume that the speech signal 111 does contain the target sentence (starting at $v_{t1}$ and ending at $v_{t2}$) which is preceded as well as followed by some unknown non-target speech. During decoding at 112, when the decoder has not yet come into the target region of the utterance ($t<v_{t1}$), either most of the paths will be discarded due to bad likelihoods (step 3.) because they do not match the modified FSG or they will be alive by matching certain parts of the FSG. In the latter case, however, the word sequence is highly unlikely to be the target sequence. Once the decoding gets into the target region ($v_{t1}<t<v_{t2}$), paths with high scores will arise starting at or around $v_{t1}$, these paths will be in good correspondence with the target sentence. Similarly, after the decoding passes the end of the target, the normalized scores of the paths alive will start decreasing and will subsequently stored and terminated (in step 4.). In the opposite case, when the speech signal 111 does not contain the target sentence at all, either no partial path will be stored (empty string 113) or its contents will be more or less random, in which case a rejection takes place at 114 (see below) with a high probability.

Proceeding onward from decoding step 112, in any eventuality, decoded text 113 will preferably be compared at a matching step 114 with target content 150. Target content 150 is preferably the "pure" or "correct" phonetic transcription of the password in question, regardless of whether it has originated from prompted text (102) or from an automatically derived baseform (104).

Matching at step 114 will preferably result in a score (155). The score (155) may be defined in essentially any of several ways. One way is to derive the score as a function directly proportional to the number of correct units and inversely proportional to the number of mismatched units, incorrectly inserted units and incorrectly deleted units. Furthermore, a special measure of the similarity of every two units may be defined and used for calculating the score. The score may alternatively be termed "confidence measure". For actual matching, "dynamic pattern matching" or "dynamic time warping" process, generally well-known to those of ordinary skill in the art, can be employed.

The obtained score then serves as a basis for a verification decision at step 160. This can be done using an utterance-normalized threshold. It should be appreciated that, through the method of dynamic pattern matching (preferably performed at step 114), it is possible to derive a confidence measure or score (155) that is suitable for the purpose of threshold-based decisions, thus maintaining the possibility of having an adjustable operation point.

Alternatively, the dynamic pattern matching score (155) described above can be combined with the acoustic score of the trellis path that corresponds to the correct-password transcription to render a verification decision at step 160. (A description of acoustic scoring may be found in U.S. Ser. No. 09/015,150 and Ramabhadran et al., supra.) In accordance with a presently preferred embodiment of the present invention, the calculation of the acoustic likelihood of the correct-baseform path is included, normalized by one or several competing paths or by an optimal null-grammar path or any of their combinations. Both the verbal-based score and the acoustic-based score are then preferably combined in either of the two following ways:

1. each score is first thresholded and the final decision is made according to the individual decisions, or
2. the scores are numerically combined before applying the threshold for final decision.

In carrying out the embodiments of the present invention, an suitable example of dynamic pattern matching (DPM) that may be employed can be found in L. R. Rabiner et al., "Considerations in Dynamic Time Warping Algorithms for Discrete Word Recognition" in IEEE Trans. On Acoustics, Speech, and Signal Processing, Vol. ASSP-26, No. 6, December 1978.

A formulation of the scoring method might be exercised as follows:

Define a pairwise distance (or alternatively "likelihood" or "similarity") measure between each of the defined decoder's units $a_1, \ldots a_w$—let this distance be symmetric and denoted by $D(a_i, a_j)$. The value of D is calculated on every node of the DPM grid whose axes are determined by the decoded sequence of units and the original (target) sequence of units, between the corresponding two units at that node. This distance (or alternatively likelihood) is accumulated in a manner described in Rabiner et al., supra, and used for finding the best path through the DPM grid. The distance (or alternatively likelihood) of the final best path is then the resulting DPM "penalty" (or "score" for likelihoods) for the threshold-based utterance rejection.

As a non-restrictive example of a way of combining DPM and acoustic scores, one could utilize a linear combination of the scores, for example:

$$\text{Score\_final} = A * \text{Score\_DPM} + B * \text{Score\_Acoust},$$

where Score_final is the final score, Score_DPM is the score obtained from dynamic pattern matching, Score_Acoust is the acoustic score and A and B are predetermined constants that respectively weight Score_DPM and Score_Acoust in a manner deemed appropriate for the application at hand.

In brief recapitulation, it will be appreciated from the foregoing that one underlying principle of utterance verification employed in connection with at least one embodiment of the present invention is to use acceptance/rejection rules based on the decoded sequence of labels or words, as opposed to using only acoustic-likelihood-based confidence measures with thresholds. Another associated principle that is preferably employed is to apply constraints within the decoder so as to allow for accurate transcription if an utterance complies with the correct password but also for erroneous transcriptions of incorrect utterances by applying competing grammar parts.

From the foregoing, it will be appreciated that a significant advantage associated with methods and apparatus according to the present invention is a very low decoding complexity (low additional computation to the forced alignment) while maintaining comparable performance of full-decoder-based systems.

As discussed heretofore, practical uses of the methods and apparatus according to at least one embodiment of the present invention are virtually limitless but may include, for example, name-based telephony applications (e.g., when a telephone number can be dialed merely by uttering a name associated with the telephone number). Another foreseen practical use is voice identification, e.g. in a computer system for permitting a user to access sensitive files. In any application, utterance rejection may be employed to prompt the user to repeat an utterance if the user's initial verbal utterance is rejected as not sufficiently matching a known password.

It is to be understood that the term "password", as employed herein, may be taken to be indicative of not only a password that is comprised of one word, but a password sentence that is comprised of more than one word. It is to be understood that the terms "password" and "password sentence" may thus be considered to be interchangeable.

It is to be understood that the present invention, in accordance with at least one presently preferred embodiment, includes a target password generator for generating at least one target password and an acceptance arrangement for comparing text based on a verbal utterance to at least one target password and for accepting or rejecting the verbal utterance based on its comparison to the at least one target password sentence. Together, the target password sentence generator and acceptance arrangement may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for verifying verbal utterances, said apparatus comprising:
    a target password sentence generator which generates at least one target password sentence;
    an acceptance arrangement which compares text based on a verbal utterance to at least one target password sentence and which accepts or rejects the verbal utterance based on its comparison to the at least one target password sentence;
    a decoder which transforms a verbal utterance into decoded text for being compared to the at least one target password sentence in said acceptance arrangement, wherein said transformation comprises transcribing the verbal utterance when the verbal utterance comprises the target password; and
    a finite state grammar generator which generates a finite state grammar to be employed by said decoder;
    said decoder being adapted to transform a verbal utterance into decoded text via employing the finite state grammar to modify the verbal utterance.

2. The apparatus according to claim 1, wherein said decoder is adapted to transform a verbal utterance into decoded text via employing the finite state grammar to undertake a forced alignment of the verbal utterance.

3. The apparatus according to claim 1, wherein said finite state grammar generator includes a first generator for generating a first part of a finite state grammar and a second generator for generating a second part of a finite state grammar.

4. The apparatus according to claim 3, wherein:
    said first generator is adapted to generate a first part of a finite state grammar that includes at least a target password sentence; and
    said second generator is adapted to generate a second part of a finite state grammar that includes competing decoding paths of the target password sentence.

5. The apparatus according to claim 1, wherein said target password sentence generator is adapted to accept prompted text corresponding to at least one password.

6. The apparatus according to claim 1, wherein said target password sentence generator is adapted to generate automatically at least one password as a baseform that is derived from an acoustic enrollment.

7. The apparatus according to claim 1, wherein said acceptance arrangement is adapted to derive a match score based on comparing text based on a verbal utterance to the at least one target password sentence and to base acceptance or rejection of the verbal utterance on the match score.

8. The apparatus according to claim 7, wherein said acceptance arrangement is adapted to derive a match score via dynamic pattern matching.

9. The apparatus according to claim 7 wherein said acceptance arrangement is adapted to derive a match score via a combination of dynamic pattern matching and acoustic scoring.

10. A method of verifying verbal utterances, said method comprising:
    generating at least one target password sentence;
    comparing text based on a verbal utterance to at least one target password sentence;
    accepting or rejecting the verbal utterance based on its comparison to the at least one target password sentence;
    transforming the verbal utterance into decoded text;
    said comparing step comprising comparing the decoded text to the at least one target password sentence; and
    generating a finite state grammar;
    said transforming step comprising transforming the verbal utterance into decoded text via employing the finite state grammar to modify the verbal utterance, wherein said modification comprises transcribing the verbal utterance when the verbal utterance comprises the target password.

11. The method according to claim 10, wherein said step of transforming the verbal utterance into decoded text comprises employing the finite state grammar to undertake a forced alignment of the verbal utterance.

12. The method according to claim 10, wherein said step of generating a finite state grammar comprises generating a first part of the finite state grammar and a second part of the finite state grammar.

13. The method according to claim 12, wherein:
    said step of generating the first part of the finite state grammar comprises the inclusion of the at least one target password sentence; and
    said step of generating the second part of the finite state grammar comprises the inclusion of competing decoding paths of the at least one target password sentence.

14. The method according to claim 10, wherein said step of generating at least one target password sentence comprises accepting prompted text.

15. The method according to claim 10, wherein said step of generating at least one target password sentence comprises automatically generating a baseform derived from an acoustic enrollment.

16. The method according to claim 10, wherein said step of accepting or rejecting comprises deriving a match score based on comparing text based on the verbal utterance to the at least one target password sentence and to base acceptance or rejection of the verbal utterance on the match score.

17. The method according to claim 16, wherein said step of deriving a match score comprises deriving a match score via dynamic pattern matching.

18. The method according to claim 16, wherein said step of deriving a match score comprises deriving a match score via a combination of dynamic pattern matching and acoustic scoring.

19. A program storage device readable by machine, tangibly embodying a program of instructions executable by the machine to perform method steps for verifying verbal utterances, said method comprising:

generating at least one target password sentence;

comparing text based on a verbal utterance to at least one target password sentence;

accepting or rejecting the verbal utterance based on its comparison to the at least one target password sentence;

transforming the verbal utterance into decoded text, said comparing step comprising comparing the decoded text to the at least one target password sentence; and generating a finite state grammar;

said transforming step comprising transforming the verbal utterance into decoded text via employing the finite state grammar to modify the verbal utterance, wherein said modification comprises transcribing the verbal utterance when the verbal utterance comprises the target password.

* * * * *

UNITED STATES PATENT AND TRADEMARK OFFICE
CERTIFICATE OF CORRECTION

PATENT NO. : 7,031,923 B1 Page 1 of 1
APPLICATION NO. : 09/519327
DATED : April 18, 2006
INVENTOR(S) : Chaudhari et al.

It is certified that error appears in the above-identified patent and that said Letters Patent is hereby corrected as shown below:

Column 12, line 1, "text," should read -- text; --

Signed and Sealed this

Twenty-seventh Day of March, 2007

JON W. DUDAS
*Director of the United States Patent and Trademark Office*